United States Patent
McCrackin et al.

(10) Patent No.: US 12,153,653 B2
(45) Date of Patent: Nov. 26, 2024

(54) COMPUTER VISION INFERENCING FOR NON-DESTRUCTIVE TESTING

(71) Applicant: Baker Hughes Holdings LLC, Houston, TX (US)

(72) Inventors: Sheldon McCrackin, Houston, TX (US); Jeremy Vandam, Edmond, OK (US); Carlneil Domkam, Houston, TX (US); Samvid Jhaveri, Oklahoma City, OK (US)

(73) Assignee: Baker Hughes Holdings LLC, Houston, TX (US)

( * ) Notice: Subject to any disclaimer, the term of this patent is extended or adjusted under 35 U.S.C. 154(b) by 285 days.

(21) Appl. No.: 17/233,404

(22) Filed: Apr. 16, 2021

(65) Prior Publication Data

US 2022/0335254 A1    Oct. 20, 2022

(51) Int. Cl.
*G06K 9/00*    (2022.01)
*G06F 18/20*    (2023.01)
(Continued)

(52) U.S. Cl.
CPC ............ *G06F 18/285* (2023.01); *G06F 18/24* (2023.01); *G06T 7/0004* (2013.01); *G06T 7/70* (2017.01); *G06T 2207/10016* (2013.01)

(58) Field of Classification Search
CPC ......... G06F 18/285; G06F 18/24; G06T 7/70; G06T 7/0004; G06T 2207/10016;
(Continued)

(56) References Cited

U.S. PATENT DOCUMENTS 8,792,705 B2 *    7/2014   Scheid ................... G06T 7/001
                                                                    382/141
9,922,269 B2 *    3/2018   Venkataraman ........ G06F 18/41
(Continued)

OTHER PUBLICATIONS

L. Xiao, T. Huang, B. Wu, Y. Hu and J. Zhou, "Surface Defect Detection using Hierarchical Features," 2019 IEEE 15th International Conference on Automation Science and Engineering (CASE), Vancouver, BC, Canada, 2019, pp. 1592-1596, doi: 10.1109/COASE.2019.8843235. (Year: 2019).*

(Continued)

*Primary Examiner* — Sean M Conner
*Assistant Examiner* — Kevin M Coomber
(74) *Attorney, Agent, or Firm* — Mintz, Levin, Cohn, Ferris, Glovsky and Popeo, P.C. US

(57) ABSTRACT

An inspection system is provided and includes a camera and controller. The controller can include one or more processors in communication with the camera and receive a plurality of images of a target captured by the camera. The controller can also determine, using a first computer vision algorithm, a first prediction and corresponding confidence level for substantially all of the images. The controller can select a subset of the images having the first prediction confidence level greater than or equal to a first prediction threshold value. The controller can additionally determine, using a second computer vision algorithm, a second prediction and corresponding second prediction confidence level for each of the selected images. The at least one second prediction can require more time to determine than the at least one first prediction. The controller can output the second prediction and the second prediction confidence level for each of the selected images.

18 Claims, 3 Drawing Sheets

(51) Int. Cl.
  *G06F 18/24* (2023.01)
  *G06T 7/00* (2017.01)
  *G06T 7/70* (2017.01)

(58) Field of Classification Search
  CPC .......... G06T 1/00; G06T 7/001; G06T 7/136; G06T 2207/20076; G06T 2207/10068; G06N 20/00; G06V 10/00; G06V 20/00; G06V 20/46; G06V 10/764; G06V 2201/06; H04W 24/00; B64F 5/60
  See application file for complete search history.

(56) References Cited

U.S. PATENT DOCUMENTS

| | | | |
|---|---|---|---|
| 10,445,871 B2 | 10/2019 | Im et al. | |
| 10,504,220 B2* | 12/2019 | Lim | G06T 7/0008 |
| 10,621,717 B2 | 4/2020 | Wang et al. | |
| 2018/0129974 A1* | 5/2018 | Giering | G05B 13/027 |
| 2018/0350056 A1 | 12/2018 | Cardenas Bernal | |
| 2019/0050987 A1 | 2/2019 | Hsieh et al. | |
| 2019/0147283 A1* | 5/2019 | Giering | G06V 10/82 |
| | | | 382/103 |
| 2020/0167905 A1* | 5/2020 | Bian | G01N 21/91 |
| 2020/0394441 A1* | 12/2020 | Wen | G06N 20/00 |
| 2021/0142160 A1* | 5/2021 | Mohseni | G06F 18/24 |
| 2021/0232141 A1* | 7/2021 | Georgeson | B64U 50/19 |
| 2021/0304400 A1* | 9/2021 | Bhate | G06V 10/7747 |
| 2022/0236197 A1* | 7/2022 | Wang | G01N 21/9515 |

OTHER PUBLICATIONS

International Search Report and Written Opinion of International Application No. PCT/US2022/071670 mailed Jul. 25, 2022, 9 pages.

Svensen, Markus, et al., "Deep Neural Networks Analysis of Borescope Images", European Conference of the Prognostics and Health Management Society, 2018, 8 pages.

Rhodes, Anthony D. et al., "High Fidelity Interactive Video Segmentation Using Tensor Decomposition, Boundary Loss, Convolutional Tessellations, and Context-Aware Skip Connections," CVMP '20: European Conference on Visual Media Production, Dec. 2020, 9 pages.

Shen, Zejiang, et al., "Deep Learning based Framework for Automatic Damage Detection in Aircraft Engine Borescope Inspection," 2019 International Conference on Computing, Networking and Communication (ICNC): Signal Processing for Communications, 2019, pp. 1005-1010.

* cited by examiner

COMPUTER VISION INFERENCING FOR NON-DESTRUCTIVE TESTING

BACKGROUND

Certain equipment and facilities, such as power generation equipment and facilities, oil and gas equipment and facilities, aircraft equipment and facilities, manufacturing equipment and facilities, and the like, include interrelated systems and processes. For example, power generation plants can include turbine systems and processes for operating and maintaining the turbine systems. Likewise, oil and gas operations can include carbonaceous fuel retrieval systems and processing equipment interconnected via pipelines. Similarly, aircraft systems can include airplanes and maintenance hangars useful in maintaining airworthiness and providing for maintenance support. During equipment operations, the equipment can degrade, encounter undesired conditions such as corrosion, wear and tear, etc., potentially affecting overall equipment effectiveness. Certain inspection techniques, such as non-destructive inspection techniques or non-destructive testing (NDT) techniques, can be used to detect undesired equipment conditions.

SUMMARY

Computer vision algorithms can be used to make predictions regarding objects of interest captured in images acquired by NDT devices, such as borescopes, during inspection (e.g., single images or individual frames of video). In this manner, predetermined objects of interest can be detected within the images. Computer vision algorithms can be further employed to further classify detected objects of interest and/or quantify the detected objects of interest (e.g., dimensions)

In order to obtain detailed and accurate predictions and/or measurements from the captured images, relatively complex computer vision algorithms can be needed. Furthermore, it is desirable for each captured image to be analyzed by the computer vision algorithm in order to ensure that objects of interest are detected and not missed. However, it can be difficult to employ complex computer vision algorithms on NDT devices for detection in real-time. In one aspect, computing resources available on NDT devices can be limited, while execution of complex computer vision algorithms can be computationally intensive. As a result, the time required to complete analysis of respective captured images can exceed the rate of capture, and identification results are not provided in real-time. In another aspect, if selected ones of the captured images are omitted from analysis by the complex computer vision algorithm to compensate, the likelihood of missing items of interest can increase. Thus, the complexity of computer vision algorithms that can be executed during real-time data capture is significantly constrained.

Accordingly, a non-destructive testing system and corresponding methods of use are provided that employ computer vision algorithms with differing degrees of computational complexity (e.g., low-fidelity and high-fidelity computer vision algorithms). The low fidelity computer vision algorithm can be computationally lightweight and configured to predict the presence of one or more objects of interest and optionally track objects of interest within the acquired images. The high fidelity computer vision algorithm can perform further predictions upon the images in which the object of interest is detected. Beneficially, this use of computer vision algorithms with differing degrees of computational complexity ensures that predictions are rapidly performed for the plurality of images and no objects of interest are missed, while further providing the capability to perform more detailed, time consuming predictions as needed.

In an embodiment, an inspection system is provided and can include a camera and a controller. The controller can include one or more processors in communication with the camera. The controller can be configured to receive a plurality of images of a target captured by the camera. The controller can be further configured to determine, using a first computer vision algorithm, at least one first prediction and a corresponding first prediction confidence level for substantially all of the plurality of images. The controller can be further configured to select a subset of the plurality of images for which the confidence level of the at least one first prediction is greater than or equal to a first prediction threshold value. The controller can additionally be configured to determine, using a second computer vision algorithm, at least one second prediction and a corresponding second prediction confidence level for each of the selected images. The second computer vision algorithm can be different from the first computer vision algorithm. The at least one second prediction can require more time to determine than the at least one first prediction. The controller can also output the at least one second prediction and the second prediction confidence level for each of the selected images.

In another embodiment, the first computer vision algorithm can determine the at least one first prediction and the corresponding first prediction confidence level for all of the plurality of images.

In another embodiment, the at least one first prediction can include at least one of a first classification of a predetermined object of interest and/or localization of the predetermined object of interest.

In another embodiment, the predetermined object of interest can be a defect within the target.

In another embodiment, the first computer vision algorithm can be at least one of a first image classification algorithm, a single shot detection algorithm, or an object tracking algorithm.

In another embodiment, the at least one second prediction can include at least one of a second classification of the predetermined object of interest or quantification of the predetermined object of interest.

In another embodiment, the second computer vision algorithm can be at least one of a region proposal network, an instance segmentation algorithm, or a semantic segmentation algorithm.

In another embodiment, the camera can be configured to transmit the captured plurality of images to the controller immediately after capture.

In another embodiment, the plurality of images can be sequential frames of a video captured by the camera or a time ordered sequence of still images.

In another embodiment, the inspection system can be a borescope.

In another embodiment, a method of inspecting a target is provided. The method can include capturing, by a camera of an inspection system, a plurality of images of a target. The method can also include receiving, by one or more processors of the inspection system, the plurality of images from the camera. The method can further include determining, by the one or more processors using a first computer vision algorithm, at least one first prediction and a corresponding first prediction confidence level for substantially all of the plurality of images. The method can additionally include selecting, by the one or more processors, a subset of the plurality of images for which the confidence level of the at least one first prediction is greater than or equal to a first prediction threshold value. The method can also include determining, by the one or more processors using a second computer vision algorithm, at least one second prediction and a corresponding second prediction confidence level for each of the selected images. The second computer vision algorithm can be different from the first computer vision algorithm. The at least one second prediction can require more time to determine than the at least one first prediction. The method can further include outputting, by the one or more processors, the at least one second prediction and the second prediction confidence level for each of the selected images.

In another embodiment, the first computer vision algorithm can determine the at least one first prediction and the corresponding first prediction confidence level for all of the plurality of images.

In another embodiment, the at least one first prediction includes at least one of a first classification of a predetermined object of interest or localization of the predetermined object of interest.

In another embodiment, the predetermined object of interest can be a defect within the target.

In another embodiment, the first computer vision algorithm can be at least one of a first image classification algorithm, a single shot detection algorithm, or an object tracking algorithm.

In another embodiment, the at least one second prediction can include at least one of a second classification of the predetermined object of interest or quantification of the predetermined object of interest.

In another embodiment, the second computer vision algorithm can be at least one of a region proposal network, an instance segmentation algorithm, or a semantic segmentation algorithm.

In another embodiment, the plurality of images can be received substantially immediately after capture by the camera.

In another embodiment, the plurality of images can be sequential frames of a video captured by the camera or a time ordered sequence of still images.

In another embodiment, the inspection system can be a borescope.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Inspection devices are commonly used in order to detect objects of interest, such as defects, within industrial machines. As an example, an inspection device can include a camera that takes pictures of a target portion of a machine, and these pictures can be subsequently analyzed to detect objects of interest within the pictures. By detecting defects, preventative maintenance can be performed before a defect causes a problem, such as machine shutdown, catastrophic failure, and/or worker injury. Analysis of the pictures can be performed using computer vision algorithms that generate predictions, such as detecting the object of interest.

As discussed in detail below, non-destructive testing systems and corresponding methods of use are provided that employ computer vision algorithms with differing degrees of computational complexity (e.g., low-fidelity and high-fidelity computer vision algorithms). The low fidelity computer vision algorithm can be computationally lightweight and configured to predict the presence of one or more objects of interest and optionally track objects of interest within the acquired images. The high fidelity computer vision algorithm can perform further predictions upon the images in which the object of interest is detected. Beneficially, this use of computer vision algorithms with differing degrees of computational complexity ensures that predictions are rapidly performed for the plurality of images and no objects of interest are missed, while further providing the capability to perform more detailed, time consuming predictions as needed.

Embodiments of sensing systems and corresponding methods for non-destructive inspection including improved computer vision inferencing are discussed herein. It can be appreciated that embodiments of the disclosure are not limited to non-destructive testing systems and can be employed with other inspection or analysis systems without limit.

Figure 1:
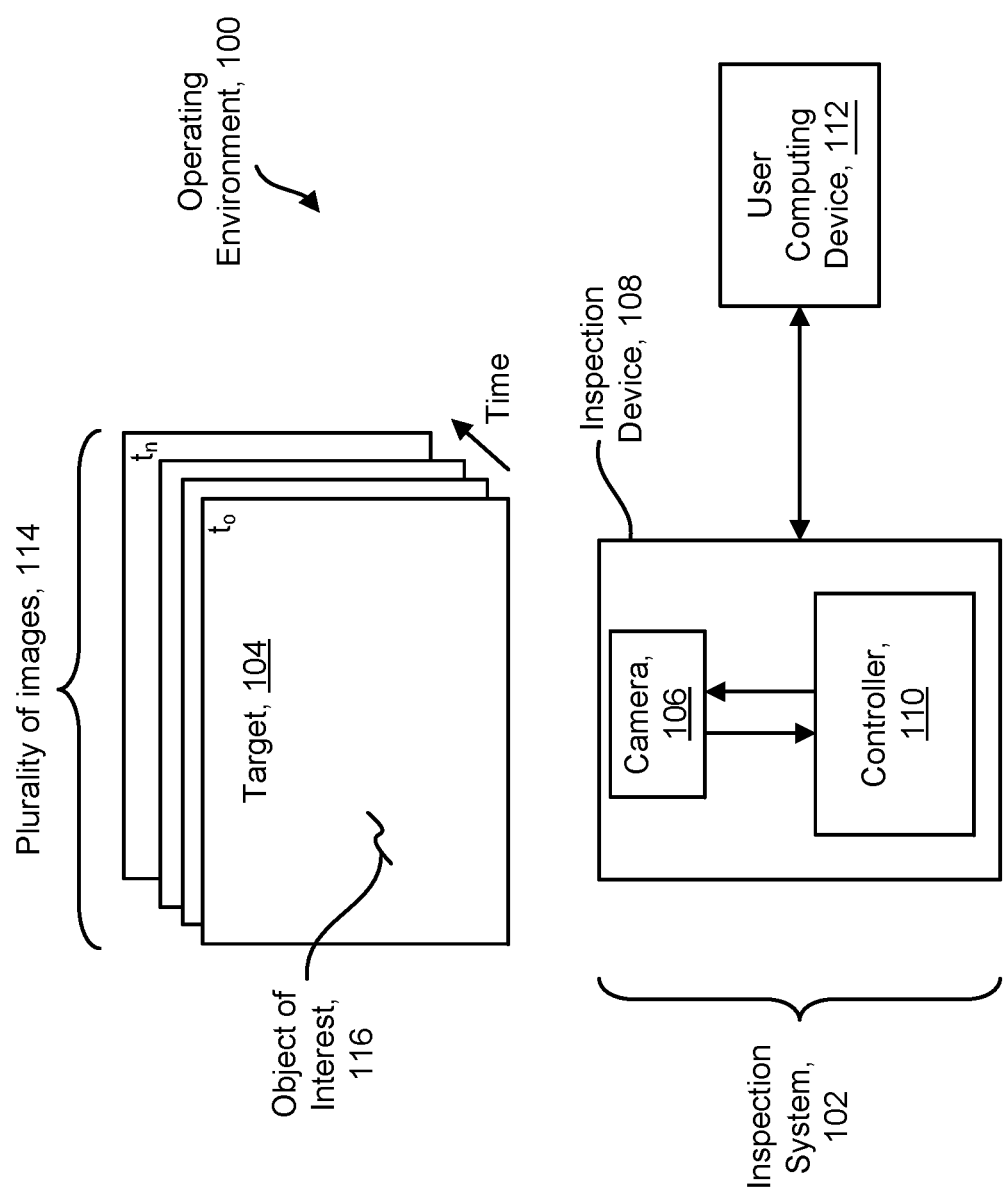
FIG. 1 is a schematic block diagram illustrating one exemplary embodiment of an operating environment including an inspection system having a camera configured to capture images of a target and a controller configured to analyze the captured images.

FIG. 1 is a schematic block diagram illustrating one exemplary embodiment of an operating environment 100 including an inspection system 102 and a target 104. As shown, the inspection system 102 includes an inspection device 108 and a user computing device 112. The inspection device 108 can include a camera 106, and a controller 110. The user computing device 112 can be in communication with the inspection device 108 (e.g., the controller 110) and the controller 110 can be in communication with the camera 106. While the user computing device and the inspection device are illustrated as separate components, in alternative embodiments they can be integrated.

During an inspection operation, the controller 110 can command the camera 106, and other components (not shown) of the inspection system 102, to perform one or more inspection operations automatically, in response to commands received from the user computer device 112 (e.g., commands entered by a human inspector), and combinations thereof. Examples of inspection operations can include, but are not limited to, movement of the camera 106 with respect to the target 104, illumination of the target 104, acquisition of a plurality of images 114 of the target 104, output of the plurality of images 114 to the user computing device 112 (e.g., for storage and/or display), analysis of the plurality of images 114, output of analysis results to the user computing device 112, and the like.

In an embodiment, the target 104 can include a rotating component, such as a shaft or tube. In further embodiments, the inspection system 102 can be configured for insertion within the target 104. In additional embodiments, the inspection device 108 can be a non-destructive testing device, such as a borescope. One exemplary embodiment of a borescope is discussed in U.S. Patent Publication No. 2019/0331613, the entirety of which is incorporated by reference herein. It can be appreciated, however, that in alternative embodiments, the inspection system can include other inspection devices including a camera and computing capability to execute a plurality of computer vision algorithms without limit.

Embodiments of the camera 106 can be configured to acquire the plurality of images 114 continuously throughout inspection of the target 104 between an inspection start time $t_o$ and an inspection stop time $t_s$. In one aspect, the camera can be a video camera and the plurality of images can be successive frames of video recorded by the camera. In another aspect, the camera can be configured to acquire still images and the plurality of images can be a time ordered sequence of the still images. In either case, the controller 110 can be configured to receive the plurality of images 114 from the camera 106 and execute a plurality of computer vision algorithms to determine predictions regarding the target 104, also referred to as inferencing, based upon the plurality of images 114. Examples of predictions can include, but are not limited to, detecting objects of interest 116 (e.g., defects), and analyzing objects of interest. The computer vision algorithms can be traditional computer vision algorithms, machine learning algorithms, and combinations thereof.

In general, it can be desirable for the controller 110 to make predictions on all or substantially all of the plurality of images 114 using the plurality of computer vision algorithms. In one aspect, substantially all of the plurality of images can be a relatively high fraction of the total number of the plurality of images (e.g., greater than or equal to about 90%, 91%, 92%, 93%, 94%, 95%, 96%, 97%, 98%, 99%, etc.) In another aspect, substantially all of the plurality of images can be a number of images of the plurality of images such that temporally adjacent images are separated in time by less than a predetermined time interval. Making predictions using all or substantially all of the plurality of images can avoid the situation where an object of interest 116 is not detected because it is only present in the image(s) for which predictions are not made and absent from the images(s) for which predictions are made. However, it can be difficult to execute complex computer vision algorithms on the inspection device 108 in real-time. As noted above, execution of complex computer vision algorithms can be computationally intensive, and the computing resources of the inspection device 108 (e.g., the controller 110) can be limited. As a result, the time required to complete predictions for each of the plurality of images 114 can exceed the rate of image capture.

Accordingly, the controller 110 can be configured to execute at least two computer vision algorithms, each having differing degrees of computational complexity. A low-fidelity computer vision algorithm can be computationally lightweight and configured to determine at least one first prediction for each of the plurality of images 114. As an example, the low-fidelity computer vision algorithm can be configured to detect at least one object of interest 116 within the plurality of images 114 and, optionally, to locate the object of interest 116 within the plurality of images 114. A high-fidelity computer vision algorithm that requires more time to complete can be performed only on a subset of the plurality of images 114 that are predicted to include the object of interest 116. In this manner, the first predictions identifying/tracking the object of interest 116 can be made for all the plurality of images 114 using the relatively fast low-fidelity computer vision algorithm, reducing the likelihood that the object of interest 116 is missed. Furthermore, second predictions analyzing the object of interest 116 in greater detail are only made for the subset of the plurality of images 114 using the relatively slower high-fidelity computer vision algorithm. This preserves the ability to conduct the more detailed, complex analysis of the object of interest 116 only on images having a high likelihood of containing the object of interest 116, conserving computing resources and electrical power.

In certain embodiments, the computer vision algorithms are solely executed by the inspection device 108 (e.g., the controller 110, alone or in combination with any other computing resources of the inspection device 108). That is, the inspection device 108 does not output the plurality of images 114 for analysis by another computing device. It can be beneficial for all analysis of the plurality of images 114 to be performed by the inspection device 108. Such a configuration can be desirable for inspection systems that are not in communication with cloud-based computing resources via a network. In one aspect, local analysis performed by the inspection device 108 alone can exhibit low to approximately zero latency, as there is no reliance on network bandwidth. As a result, the object of interest 116 can be found in real-time, allowing the operator of the inspection device 108 to make decisions faster. In another aspect, the security of data generated during analysis of the plurality of images 114 is improved, as this data is maintained on the inspection device 108 and not transmitted over a network where it can be exposed.

Figure 2:
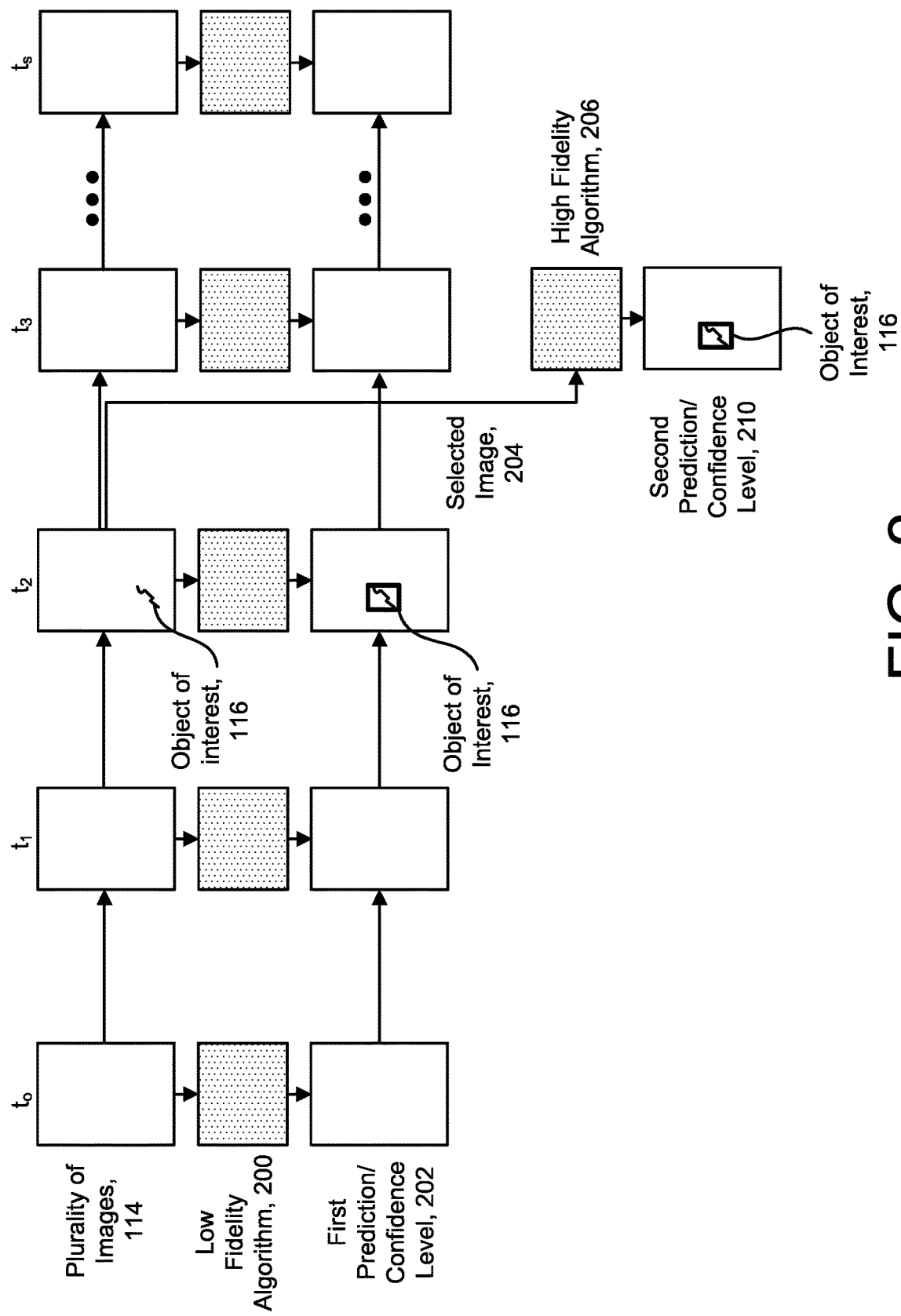
FIG. 2 is a block diagram illustrating one exemplary embodiment of computer vision inferencing performed by the inspection system of FIG. 1.

FIG. 2 is a block diagram illustrating one exemplary embodiment of computer vision inferencing including a plurality of computer vision algorithms performed by the inspection device 108 of FIG. 1. As shown, respective images of the plurality of images 114 are analyzed in order of their time of capture, from the start time $t_o$ to the stop time $t_s$ (e.g., $t_o$, $t_1$, $t_3$, $t_4$, and $t_s$). As shown, low fidelity algorithm 200 receives a respective image of the plurality of images 114 and generates a first prediction and a corresponding first prediction confidence level 202 regarding at least one object of interest 116.

In an embodiment, the object of interest 116 can be a defect. Embodiments of defects can adopt a variety of configurations. Examples can include, but are not limited to, cracks, peeling, changes in surface profile including pits and/or bulges, spots of different color, corrosion, defective welds, absent welds, structural defects (e.g., structural characteristics that do not match a predetermined technical specification), coating loss, erosion, and the like. It can be understood that this discussion is not exhaustive and embodiments of the computer vision algorithms can be configured to make predictions regarding other objects of interest without limit.

Embodiments of the low-fidelity computer vision algorithm can be configured to perform first predictions in the form of classification, localization, detection, and/or tracking and can adopt a variety of configurations. Examples can include, but are not limited to, image classification algorithms, single shot detection algorithms, and object tracking algorithms.

Classification can determine whether an image falls within a certain category, such as containing the object of interest 116 or not containing the object of interest 116. It can be appreciated that classification at this level may not determine what the object of interest 116 is, but merely determine that the image may contain a feature that the low-fidelity algorithm recognizes as the object of interest 116.

Localization can specify the location of the object of interest 116 within the image. In further embodiments, localization can specify the location of multiple objects of interest 116 within a single image of the plurality of images 114.

Detection can identify at least one specific object of interest 116 within the image. In further embodiments, detection can identify multiple objects of interest within the image. As an example, a bounding box can be determined and everything inside the bounding box can be identified.

Object tracking can monitor the location of at least one object of interest 116 across multiple images of the plurality of images. Object tracking can be performed in a variety of ways. In one embodiment, the object of interest 116 can be tracked using a minimum output sum of least squared error (MOSSE) filter. The MOSSE filter takes a bounding box and updates the subsequent images through the use of a correlation filter. By using a correlation filter the MOSSE tracking algorithm becomes insensitive to factors such as light positioning non-rigid transformations and scale.

In another embodiment, the object of interest 116 can be tracked using a re-identification network combined with an assignment algorithm (e.g., the Kuhn-Munkres Algorithm). In this scenario, an affinity matrix is calculated between the detection and the tracked object. This matrix calculates how similar objects in the image are. Subsequently, an assignment algorithm is used to match tracked objects in the current image to objects in the previous image. The re-identification network can provide another level of specificity by assigning unique identifiers to defects within a specific class. For example, a first crack A is different from a second crack B, so the first crack A will be assigned an identifier of 0 and the second crack B will be assigned an identifier of 1.

Once the first prediction and first prediction confidence level 202 is made, it can be used to identify the images of the plurality of images 114 that are selected for further analysis by a high-fidelity algorithm 206. As shown, the images captured at times $t_0$, $t_1$, $t_3$, and $t_s$ do not include the object of interest 116, while the image captured at time t2 does include the object of interest 116. As an example, in the context of a first prediction for classification of the object of interest 116 within an image, the first prediction confidence level can be relatively low in the images for times $t_0$, $t_1$, $t_3$, and $t_s$, below a predetermined first prediction threshold value. In contrast, the first prediction confidence level for this classification can be relatively high in the image for time $t_2$, above the predetermined first prediction threshold value.

As the first prediction confidence level for the images at times $t_0$, $t_1$, $t_3$, and $t_s$ are below the predetermined first prediction threshold value, these images are not selected for further analysis using the high fidelity computer vision algorithm 206. In contrast, as the first prediction confidence level for the image at time $t_2$ is above the predetermined first prediction threshold value, the image at time $t_2$ can be selected for input to the high fidelity computer vision algorithm 206, which determines a second prediction therefrom and outputs the second prediction and a corresponding second prediction confidence level.

Embodiments of the high-fidelity computer vision algorithm 206 can be configured to further classify, quantify, and/or analyze the object of interest within the selected images. Examples can include, but are not limited to, regional proposal networks, instance segmentation, and semantic segmentation. The high-fidelity computer vision algorithms 206 can provide significantly improved predictions as compared to the low-fidelity computer vision algorithms:

Regional proposal networks are more accurate object detection models as compared to single shot detection models. They provide higher accuracy metrics for both the classification of the object of interest 116 and localization of the object of interest 116.

Semantic segmentation models can provide a pixel level classification for all pixels in the image being analyzed. Each pixel can be classified as either: Object A, Object B, Object C . . . Object n, or background (no object of interest 116). This is can be a more accurate and detailed method of localizing the object of interest 116 in the image.

Instance Segmentation combines object detection and semantic segmentation. Each pixel is assigned a classification and a unique object identifier. For example, an object detection model can draw polygons around each crack in an image and uniquely identify 3 cracks. A semantic segmentation model can determine the individual pixels associated with the class "crack", but cannot uniquely identify the 3 cracks. In contrast, an instance segmentations model can both identify the class associated with each pixel and uniquely identify all of the objects of interest 116 and which pixel is associated with each.

In an embodiment, the second prediction can be another classification of the least one object of interest within the selected image. In one embodiment, the classification of the second prediction can confirm the first prediction by predicting the same object of interest above the predetermined second prediction confidence threshold. The second prediction confidence threshold can be the same or different than the first prediction confidence threshold. In another embodiment, the classification of the second prediction can be a more detailed classification. Assume for example that the first prediction is a genus classification (e.g., defect is present). The second prediction can be a species or sub-species classification of that genus (e.g., the defect is a crack, the defect is a crack having a spider-web geometry, etc.)

In another embodiment, the second prediction can quantify the object of interest. Examples of quantifying can include, but are not limited to, using segmentation models to determine the number of pixels (total area, length, etc.) associated with the object of interest 116. This data can subsequently be used to calculate a physical measurement (e.g., in terms of inches or square inches).

In another embodiment, the second prediction can analyze the object of interest 116. Examples of quantifying can include, but are not limited to, a combination of classifying the object of interest 116, quantifying the object of interest 116, and determining where the object of interest 116 is in respect to the target 104 (e.g., a crack in one area of the target has a different length limit than a crack in another area of the target where the stress is higher).

Figure 3:
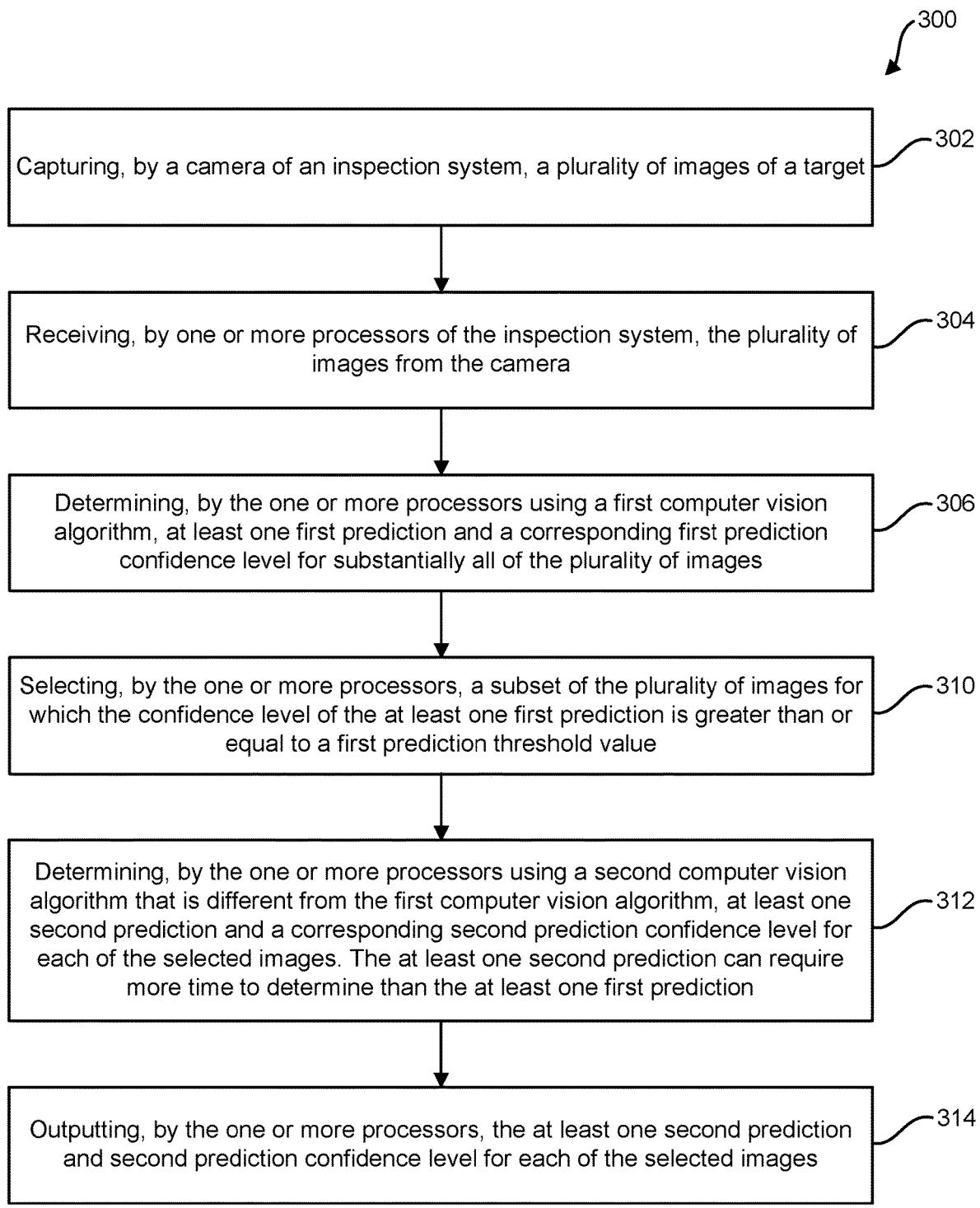
FIG. 3 is a flow diagram illustrating one exemplary embodiment of an inspection method for computer vision inferencing performed by the inspection system of FIG. 1.

FIG. 3 is a flow diagram illustrating one exemplary embodiment of an inspection method 300. The inspection method can include computer vision inferencing performed by the inspection system 102 of FIG. 1. As shown, the method 300 includes operations 302-314. However, alternative embodiments of the method can include greater or fewer operations than illustrated in FIG. 3 and the operations can be performed in an order different than FIG. 3.

In operation 302, the camera 106 of the inspection system 102 can acquire the plurality of images 114 of the target 104. In certain embodiments, the inspection device 108 can be a borescope. The plurality of images 114 can be sequential frames of a video captured by the camera or a time ordered sequence of still images.

In certain embodiments, the plurality of images 114 can be received by the controller 110 substantially immediately after capture by the camera 106. As an example, the time delay between capture by the camera 106 and receipt by the controller 110 can be less than about 100 ms. In further embodiments, the controller 110 can receive the plurality of images 114 directly from the camera 106.

In operation 304, one or more processors of the inspection system 102 (e.g., the controller 110) can receive the plurality of images 114 from the camera 106.

In operation 306, the one or more processors of the controller 110 can determine at least one first prediction and a corresponding first prediction confidence level 202 for substantially all of the plurality of images 114. The at least one first prediction can include at least one of a first classification of a predetermined object of interest 115 and localization of the predetermined object of interest 116. The at least one first prediction can be determined using a first computer vision algorithm (e.g., a trained computer vision algorithm). Examples can include, but are not limited to a first image classification algorithm, a single shot detection algorithm, or an object tracking algorithm. The predetermined object of interest 116 can be a defect within the target 104.

In operation 310, the one or more processors of the controller 110 can select a subset of the plurality of images 114 for which the first prediction confidence level is greater than or equal to a first prediction threshold value.

In operation 312, the one or more processors of the controller 110 can determine at least one second prediction and a corresponding second prediction confidence level 210 for each of the selected images. The at least one second prediction can include at least one of a second classification of the predetermined object of interest 116 or quantification of the predetermined object of interest 116. The at least one second prediction can require more time to complete than the at least one first prediction.

The second computer vision algorithm (e.g., a trained computer vision algorithm) can be different from the first computer vision algorithm. As an example, the second computer vision algorithm can be at least one of a region proposal network, an instance segmentation algorithm, and a semantic segmentation algorithm.

In operation 314, the one or more processors of the controller 110 can output the at least one second prediction and second prediction confidence level 210 for each of the selected images. As an example, the at least one second prediction and second prediction confidence level 210 can be output to the user computing device 112 for display and/or storage.

Exemplary technical effects of the methods, systems, and devices described herein include, by way of non-limiting example the ability to inference in real-time on all, or substantially all, images of a plurality of images captured within a video or a series of still images to identify potential items of interest. This ensures that all potential items of interest are identified and/optionally located in each of the plurality of images without sacrificing inspection speed. By using the low-fidelity computer vision algorithm to inference all or substantially all of the plurality of images, electrical power of the inspection device can be conserved. This allows for longer inspection times away from a central power source.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An inspection system, comprising:
   a camera;
   a controller including one or more processors in communication with the camera, the controller being configured to:
   receive a plurality of images of a target captured by the camera;
   determine, using a first computer vision algorithm, a first prediction of a defect within the target and a corresponding first prediction confidence level for substantially each of the plurality of images;
   select a subset of the plurality of images for which the confidence level of the first prediction is greater than a first prediction threshold value;
   determine, using a second computer vision algorithm that is different from the first computer vision algorithm, a second prediction of the defect and a corresponding second prediction confidence level for only each of the selected images in the subset, wherein the second computer vision algorithm includes at least one of a regional proposal network and an instance segmentation model; and
   output the second prediction and the second prediction confidence level for each of the selected images in the subset.

2. The system of claim 1, wherein the first computer vision algorithm determines the first prediction and the corresponding first prediction confidence level for all of the plurality of images.

3. The system of claim 1, wherein the first prediction comprises a first classification of the defect.

4. The system of claim 1, wherein the first computer vision algorithm is at least one of a first image classification algorithm, a single shot detection algorithm, or an object tracking algorithm.

5. The system of claim 1, wherein the second prediction comprises at least one of a second classification of the defect or quantification of the defect.

6. The system of claim 1, wherein the camera is configured to transmit the captured plurality of images to the controller immediately after capture.

7. The system of claim 1, wherein the plurality of images are sequential frames of a video captured by the camera or a time ordered sequence of still images.

8. The system of claim 1, wherein the inspection system is a borescope.

9. The system of claim 1, wherein the first prediction comprises a localization of the defect within the target.

10. A method of inspecting a target, comprising:
    capturing, by a camera of an inspection system, a plurality of images of a target;
    receiving, by one or more processors of the inspection system, the plurality of images from the camera;
    determining, by the one or more processors using a first computer vision algorithm, a first prediction of a defect within the target and a corresponding first prediction confidence level for substantially each of the plurality of images; selecting, by the one or more processors, a subset of the plurality of images for which the confidence level of the at least one first prediction is greater than a first prediction threshold value;

determining, by the one or more processors using a second computer vision algorithm that is different from the first computer vision algorithm, a second prediction of the defect and a corresponding second prediction confidence level for only each of the selected images in the subset, wherein the second computer vision algorithm includes at least one of a regional proposal network and an instance segmentation model; and outputting, by the one or more processors, the at least one second prediction and the second prediction confidence level for each of the selected images in the subset.

11. The method of claim 10, further comprising determining the first prediction and the corresponding first prediction confidence level for all of the plurality of images.

12. The method of claim 10, wherein the at least one first prediction comprises a first classification of the defect.

13. The method of claim 10, wherein the first computer vision algorithm is at least one of a first image classification algorithm, a single shot detection algorithm, or an object tracking algorithm.

14. The method of claim 10, wherein the second prediction comprises at least one of a second classification of the defect or quantification of the defect.

15. The method of claim 10, wherein the plurality of images are received substantially immediately after capture by the camera.

16. The method of claim 10, wherein the plurality of images are sequential frames of a video captured by the camera or a time ordered sequence of still images.

17. The method of claim 10, wherein the inspection system is a borescope.

18. The method of claim 10, wherein the at least one first prediction comprises a localization of the defect within the target.

* * * * *